Dec. 30, 1969    C. LE BARON    3,486,776
METHOD AND MEANS OF SECURING A ROLLER ON A SHAFT
Filed Feb. 7, 1968
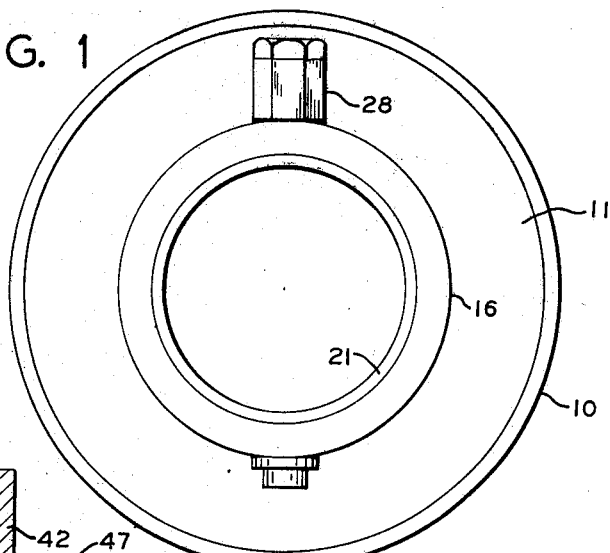
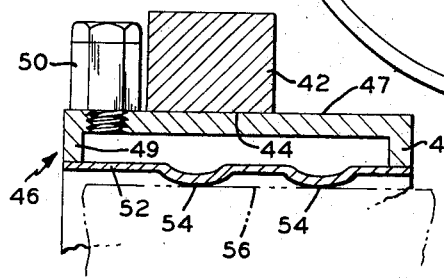
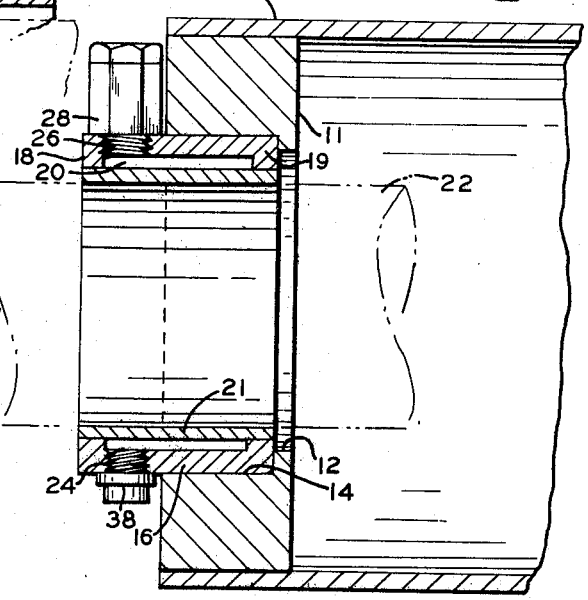
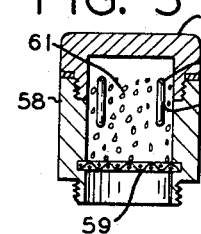
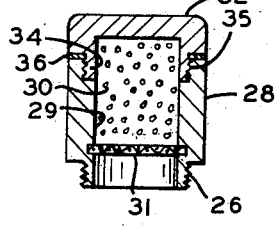
INVENTOR.
CHESTER LE BARON
BY:
JOHN P. CHANDLER
HIS ATTORNEY.

United States Patent Office 3,486,776
Patented Dec. 30, 1969

3,486,776
METHOD AND MEANS OF SECURING A ROLLER ON A SHAFT
Chester LeBaron, 135 Hopper Ave., Waldwick, N.J. 07463
Filed Feb. 7, 1968, Ser. No. 703,599
Int. Cl. F16c *13/00*
U.S. Cl. 287—52.01                                6 Claims

ABSTRACT OF THE DISCLOSURE

Means for securing a roller in non-rotating relation on a shaft with its periphery concentric with the shaft axis, including providing an annular member secured centrally of one of the end walls of the roller and having an annular chamber therein, and a thin tube closing said chamber and snugly fitting the shaft. The annular chamber has openings on opposite sides of the axis, one of said openings receiving a fluid and having a closure cap to seal the same. A pressure vessel with a threaded nipple in the other one of said openings, the vessel having a bore to receive a chemical which reacts with the fluid when the roller is rotated to permit the fluid to pass downwardly into the pressure vessel to contact the chemical and develop a pressure sufficient to expand the walls of the tube into firm engagement with the shaft.

---

This invention relates to a method and means for securing a roller or cylinder on a shaft in non-rotative relation and relates more particularly to a novel method of utilizing pressures developed by an explosive charge or by a simple chemical reaction for constricting a collar formed with a thin annular membrane on its inner surface around a shaft, the membrane closing an annular channel in an end wall of the roller. In some instances, the arrangement may be reversed and the closed annular channel will be formed in the shaft or in a member permanently fixed to the shaft.

Cylinders of this type are used on printing presses, embossing machines and the like where a drive is imparted to the shaft which is journalled in a frame, and it is necessary to firmly secure the roller or cylinder to the shaft in such a fashion that the periphery of the roller is absolutely concentric with the shaft axis. Since these rollers must be changed from time to time, it is most desirable that the roller be readily mounted on the shaft and be easily removed therefrom in a minimum amount of time.

One method that has given good results is to employ a simple grease gun that can be attached to a fitting leading to the channel and a check valve confines the grease or other fluid in the channel and thus maintains the pressure for a considerable period of time.

An important object of the present invention is to provide a method for quickly generating a sufficient pressure in the channel for securing the roller against rotation on the shaft and for accomplishing this without the necessity for any manual effort whatsoever on the part of the operator such as is required for the pumping of the grease gun just mentioned. Another object, of course, is to generate pressure from gas which will not decay as time passes.

In accordance with the present invention, this is accomplished by providing a small pressure vessel connected with the chamber and forming a closed reaction zone outside the chamber at each end of the roller. The vessel is located eccentrically of the axis. In this reaction vessel, which can be tightly closed, is placed a compound which when it reacts with a fluid generates pressure and heat. The pressure only is utilized in the mechanics of the present invention. On the opposite side of the axis, there is a port leading to the chamber and into which the reacting liquid is introduced. A bleeder valve is associated with this port. The first step is to turn the demountable roller or cylinder so that the port is uppermost. The desired quantity of fluid for the reaction is poured into the port and the port closed.

The roller is now turned 180° so that the small reaction vessel is uppermost and a quantity of the dry chemical is placed in the vessel. A screen at the lower end retains the chemical in the reaction chamber. The closure cap is now applied and the roller again rotated 180° so that the fluid enters the reaction zone.

Various chemicals when placed in contact with a fluid react and produce sufficient pressure for the purpose of the present invention. It is preferred to use a combination wherein the reaction stops when sufficient pressure has been developed even though the starting materials have not been depleted. I have gotten good results with sodium and water. The sodium decomposes the water violently, liberating $H_2$. This reaction is accompanied by heat and pressure as a result of the volumetric increase of the gaseous product of the reaction, namely the $H_2$. If the reaction takes place in an open area, it will continue until all the Na has combined with the OH group or until the water is depleted. Since the reaction occurs in the pressure vessel, it continues until the pressure reaches a predetermined value, after which the reaction ceases and if the pressure remains confined, it does not rise or fall except to the minor extent expected as the temperature in the vessel rises or falls. During this period of maintenance, the pressure of the remaining starting materials remain unchanged. If the vessel is opened, the reaction resumes and continues until the Na or the $H_2O$ are depleted.

In the second form of the invention an explosive charge from a blank cartridge is used to generate the pressure.

In the drawings:
FIG. 1 is an end elevation of a demountable roller embodying the present invention;
FIG. 2 is a section taken on line 2—2 of FIG. 1;
FIG. 3 is a section taken through the reaction chamber;
FIG. 4 is a broken section similar to FIG. 2 but showing a modification.
FIG. 5 shows a modification.

A roller is shown at 10 and it has end discs 11 firmly secured thereto as by welding. The disc has a bore 12 with a counterbore 14 to receive the collar unit comprising an annular member or annulus 16 having end walls 18 and 19 to form a chamber 20. A thin annular tube 21 is welded at its ends to these end walls to close the channel. The assembly is received in the counterbore and secured. It has a snug fit on the shaft shown at 22. On each side of the axis the collar unit has a threaded opening 24 and in one of said openings a nipple 26 integral with a small pressure vessel 28 is received.

This vessel has a longitudinal bore 29 forming the reaction zone in which the compound 30 is positioned. A screen 31 is received in an annular recess at the lower end of the chamber. The chamber is closed by a cap 32 having a reduced threaded nipple section 34 received in a thread section 35 at the upper end of the chamber. A copper gasket 36 secures the cap in fluid tight relation.

The lower threaded opening receives a bleeder valve 38 which can be opened to receive the water when this opening is uppermost. This should be done before the reaction chamber is charged with the other chemical. The reaction moves ahead until the desired pressure is built up and then stops. The amount of sodium used can be determined by experiment. A similar assembly may by positioned at the other end of the cylinder.

The reaction between the sodium and the water, which is inherently violent can be moderated by amalgamating the sodium with mercury.

Other chemical reactions may include the dissolution of iron filings in dilute sulfuric acid. If a longer chamber like that shown in FIG. 4 is required and hence the need for larger quantities of hydrogen, I can use calcium hydride with water ($CaH_2 + 2H_2O$) producing $$Ca(OH)_2 + 2H_2$$

This procedure may be found to be somewhat safer than using the metallic sodium wherein the sodium could conceivably ignite the hydrogen and cause an explosion. In view of the small quantity involved, this is not very likely and if desired, potassium may be used in place of the sodium. If the calcium hydride is used, 1 kg. of $CaH2 + H_2O$ will produce about 1 m.$^3$ of hydrogen. Another process sometimes used for the production of moderate amounts of hydrogen is the dissolution of aluminum or silicon in alkali $2Al + 2NaOH + 6H_2O$ yields $2NaAl(OH)_4 + 3H_2$ or $Si + 4NaOH$ which yields $Na_2SO_4 + 2H_2$.

In the modified arrangement shown in FIG. 4, the end wall 42 of the cylinder has a central bore 44 which receives the unit 46 which in this instance is somewhat longer than that shown in FIG. 2. The annulus 47 has the end walls 48 and 49 and the pressure vessel 50 is the same as that shown in FIGS. 2 and 3. The thin walled tube 52, instead of being straight as shown in FIG. 2, has two annular ribs 54 which engage the shaft 56 and since the shaft is engaged at two points at each end, the proper alignment is facilitated.

In the arrangement of FIG. 5 the pressure vessel 58 again has a screen 59 at the lower end and a threaded cap 60 at its upper end. A small quantity of explosive powder shown at 61 is supported on the screen and the powder is ignited by an electric heating element 62 having leads 64 which are sealed in openings in the wall of the vessel. Instead of the heating element, higher voltage could be used to produce a spark. The pressure created by firing the charge proves very effective to secure the roller in clamped relation on the shaft.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claim are intended to be included therein.

What I claim is:

1. The combination with a roller with end walls having central openings to receive a shaft, of means for securing the roller in non-rotative relation on the shaft with its periphery concentric with the shaft axis, said means including an annular member secured centrally of one of said end walls and having an annular chamber therein, and a thin walled tube closing said chamber and snugly fitting the shaft, a closed pressure vessel mounted on the outer periphery of the annular member and in communication with said chamber, and chemical means in the vessel for generating pressure sufficient to expand the walls of the tube into firm engagement with the shaft, said pressure vessel having apertured means at one end for confining said chemical means while allowing liquid access thereto.

2. The structure of claim 1 wherein the anular chamber has openings on opposite sides of the shaft axis, one of said openings receiving a fluid, a closure cap in one of said openings to seal the same and said pressure vessel having a threaded nipple in the other one of said openings, the vessel having a bore to receive a chemical which reacts with the fluid when the roller is rotated to permit the fluid to pass downwardly into the pressure vessel to contact the chemical and develop said pressure.

3. The structure of claim 2 wherein the pressure vessel has a screen at one end for confining the chemical therein.

4. The structure of claim 1 wherein sodium and water unite to produce the reaction.

5. The structure of claim 1 wherein potassium and water unite to produce the reaction.

6. The structure of claim 1 wherein calcium hydroxide and water unite to produce the reaction.

References Cited

UNITED STATES PATENTS

| 2,583,117 | 11/1952 | Piperoux et al. | |
|---|---|---|---|
| 3,120,259 | 2/1964 | Orr. | |
| 3,378,902 | 4/1968 | Hoexter | 29—113 |

FOREIGN PATENTS 569,773   11/1957   Italy.

DAVID J. WILLIAMOWSKY, Primary Examiner

A. V. KUNDRAT, Assistant Examiner

U.S. Cl. X.R.

29—113